United States Patent
Hirai

(10) Patent No.: US 10,936,332 B2
(45) Date of Patent: Mar. 2, 2021

(54) SETTING METHOD, SETTING DEVICE, AND STORAGE MEDIUM

(71) Applicant: FUJITSU LIMITED, Kawasaki (JP)

(72) Inventor: Akira Hirai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 16/286,682

(22) Filed: Feb. 27, 2019

(65) Prior Publication Data
US 2019/0196844 A1 Jun. 27, 2019

Related U.S. Application Data

(63) Continuation of application No. PCT/JP2017/046677, filed on Dec. 26, 2017.

(30) Foreign Application Priority Data

Jan. 5, 2017 (JP) .............................. JP2017-000616

(51) Int. Cl.
*G06F 9/445* (2018.01)
*H04L 12/46* (2006.01)
(Continued)

(52) U.S. Cl.
CPC .............. *G06F 9/445* (2013.01); *H04L 12/28* (2013.01); *H04L 12/46* (2013.01); *H04L 49/351* (2013.01); *H04L 49/354* (2013.01)

(58) Field of Classification Search
None
See application file for complete search history.

(56) References Cited

U.S. PATENT DOCUMENTS

| 9,009,284 B2 * | 4/2015 | Nakamura | ............ H04L 12/417 709/223 |
| 2005/0114507 A1 * | 5/2005 | Tarui | ................... H04L 61/2015 709/224 |

(Continued)

FOREIGN PATENT DOCUMENTS

| JP | 2005-151107 A | 6/2005 |
| JP | 2010-220103 A | 9/2010 |

(Continued)

OTHER PUBLICATIONS

International Search Report and Written Opinion of the International Searching Authority (Form PCT/ISA/210, 220, Form PCT/ISA/237), mailed in connection with PCT/JP2017/046677 and dated Mar. 27, 2018 (8 pages).

*Primary Examiner* — Gregory B Sefcheck
*Assistant Examiner* — Srinivasa R Reddivalam
(74) *Attorney, Agent, or Firm* — Fujitsu Patent Center

(57) ABSTRACT

A non-transitory storage medium storing a program that causes a computer to execute a process, the process includes detecting connection relationship between a server and a communication device that belong to a system to generate physical connection information indicating the connection relationship; referring to design information related to connection of the server and the communication device to compare the physical connection information and the design information to determine presence or absence of an error in the connection relationship; determining whether a predetermined setting corresponding to the design information is applicable to a port of the communication device corresponding to the connection relationship determined as erroneous; applying the predetermined setting to the port of the communication device to which the predetermined setting has been determined as applicable; and changing the design information related to the communication device to which (Continued)

the predetermined setting has been applied, based on the physical connection information.

10 Claims, 19 Drawing Sheets

(51) Int. Cl.
*H04L 12/28* (2006.01)
*H04L 12/931* (2013.01)

(56) References Cited

U.S. PATENT DOCUMENTS

| | | | |
|---|---|---|---|
| 2007/0201618 A1* | 8/2007 | Nozuyama | G01R 31/31835 379/14.01 |
| 2011/0134796 A1* | 6/2011 | Tanizawa | H04L 12/6418 370/254 |
| 2011/0219268 A1* | 9/2011 | Yoshida | G06F 11/34 714/39 |
| 2013/0111036 A1 | 5/2013 | Ozawa et al. | |
| 2014/0334313 A1* | 11/2014 | Nakamura | H04L 12/40019 370/241 |
| 2015/0195152 A1* | 7/2015 | Shinohara | H04L 67/10 709/223 |
| 2016/0295307 A1 | 10/2016 | Kikuzawa | |

FOREIGN PATENT DOCUMENTS

| | | |
|---|---|---|
| JP | 2013-097394 A | 5/2013 |
| JP | 2013-247410 A | 12/2013 |
| JP | 2014-225719 A | 12/2014 |
| JP | 2015-195487 A | 11/2015 |
| WO | 2015/087457 A1 | 6/2015 |

* cited by examiner

FIG. 3

| DESIGN SERVER ID | DESIGN NETWORK INTERFACE ID | DESIGN SWITCH ID | DESIGN PORT ID | DESIGN PORT SETTING |
|---|---|---|---|---|
| 1 | BMC | 1 | 1 | UntagVLAN:101, STP:off, LLDP:off |
| 1 | LAN1 | 2 | 1 | UntagVLAN:201, STP:off, LLDP:off |
| 1 | LAN2 | 3 | 1 | UntagVLAN:301, STP:off, LLDP:off |
| 2 | BMC | 1 | 2 | UntagVLAN:102, STP:off, LLDP:off |
| 2 | LAN1 | 2 | 2 | UntagVLAN:202, TagVLAN:302, STP:off, LLDP:off |
| 2 | LAN2 | 3 | 2 | UntagVLAN:202, TagVLAN:302, STP:off, LLDP:off |
| .. | .. | .. | .. | .. |

FIG. 4

| SWITCH ID \ PORT ID | 1 | 2 | 3 | 4 | 5 | 6 | 7 | 8 | 9 | 10 |
|---|---|---|---|---|---|---|---|---|---|---|
| 1 | 101 | 102 | 103 | 104 | 105 | 106 | 107 | 108 | 109 | 110 |
| 2 | 111 | 112 | 113 | 114 | 115 | 116 | 117 | 118 | 119 | 120 |
| 3 | 121 | 122 | 123 | 124 | 125 | 126 | 127 | 128 | 129 | 130 |

FIG. 7

| DETECTED MAC ADDRESS | DETECTED LEASE IP ADDRESS | DETECTED SWITCH ID | DETECTED PORT ID |
|---|---|---|---|
| f8:0f:41:f2:aa:4e | 192.168.101.100 | 1 | 1 |
| f8:0f:41:f2:aa:50 | 192.168.102.100 | 1 | 2 |
| f8:0f:41:f2:aa:58 | 192.168.103.100 | 1 | 3 |
| ⋮ | ⋮ | ⋮ | ⋮ |

FIG. 8

| DETECTED MAC ADDRESS | DETECTED LEASE IP ADDRESS | DETECTED SWITCH ID | DETECTED PORT ID | |
|---|---|---|---|---|
| f8:0f:41:f2:aa:4e | 192.168.101.100 | 1 | 1 | |
| f8:0f:41:f2:aa:50 | 192.168.102.100 | 1 | 2 | |
| f8:0f:41:f2:aa:58 | 192.168.103.100 | 1 | 3 | |
| ⋮ | ⋮ | ⋮ | ⋮ | |
| f8:0f:41:f2:01:3a | 192.168.121.100 | 3 | 1 | ⎫ |
| f8:0f:41:f2:01:3b | 192.168.111.100 | 2 | 1 | ⎪ |
| f8:0f:41:f2:02:12 | 192.168.122.100 | 3 | 2 | ⎬ ADDED |
| f8:0f:41:f2:02:13 | 192.168.112.100 | 2 | 2 | ⎪ |
| f8:0f:41:f2:05:69 | 192.168.113.100 | 2 | 3 | ⎪ |
| f8:0f:41:f2:05:68 | 192.168.124.100 | 3 | 4 | ⎭ |
| ⋮ | ⋮ | ⋮ | ⋮ | |

FIG. 9

| NETWORK INTERFACE ID | MAC ADDRESS |
|---|---|
| BMC | f8:0f:41:f2:aa:50 |
| LAN1 | f8:0f:41:f2:02:12 |
| LAN2 | f8:0f:41:f2:02:13 |

⋮

| NETWORK INTERFACE ID | MAC ADDRESS |
|---|---|
| BMC | f8:0f:41:f2:aa:4e |
| LAN1 | f8:0f:41:f2:01:3a |
| LAN2 | f8:0f:41:f2:01:3b |

FIG. 10

| DETECTED SERVER ID | DETECTED NETWORK INTERFACE ID | DETECTED MAC ADDRESS | DETECTED SWITCH ID | DETECTED PORT ID |
|---|---|---|---|---|
| 1 | BMC | f8:0f:41:f2:aa:50 | 1 | 2 |
| 1 | LAN1 | f8:0f:41:f2:02:12 | 3 | 2 |
| 1 | LAN2 | f8:0f:41:f2:02:13 | 2 | 2 |
| 2 | BMC | f8:0f:41:f2:aa:4e | 1 | 1 |
| 2 | LAN1 | f8:0f:41:f2:01:3a | 3 | 1 |
| 2 | LAN2 | f8:0f:41:f2:01:3b | 2 | 1 |
| ⋮ | ⋮ | ⋮ | ⋮ | ⋮ |

FIG. 11

| \<- PHYSICAL CONNECTION INFORMATION -\> | | | | | \<- DESIGN INFORMATION -\> | | |
|---|---|---|---|---|---|---|---|
| DETECTED SERVER ID | DETECTED NETWORK INTERFACE ID | DETECTED MAC ADDRESS | DETECTED SWITCH ID | DETECTED PORT ID | DESIGN SWITCH ID | DESIGN PORT ID | DESIGN PORT SETTING |
| 1 | BMC | f8:0f:41:f2:aa:50 | 1 | 2 | 1 | 2 | UntagVLAN:102, STP:off, LLDP:off |
| 1 | LAN1 | f8:0f:41:f2:02:12 | 3 | 2 | 2 | 2 | UntagVLAN:202, TagVLAN:302, STP:off, LLDP:off |
| 1 | LAN2 | f8:0f:41:f2:02:13 | 2 | 2 | 3 | 2 | UntagVLAN:202, TagVLAN:302, STP:off, LLDP:off |
| 2 | BMC | f8:0f:41:f2:aa:4e | 1 | 1 | 1 | 1 | UntagVLAN:101, STP:off, LLDP:off |
| 2 | LAN1 | f8:0f:41:f2:01:3a | 3 | 1 | 2 | 1 | UntagVLAN:201, STP:off, LLDP:off |
| 2 | LAN2 | f8:0f:41:f2:01:3b | 2 | 1 | 3 | 1 | UntagVLAN:301, STP:off, LLDP:off |
| ... | ... | ... | ... | ... | ... | ... | ... |

FIG. 12A

| DETERMINATION ORDER | DETERMINATION ITEM | APPLICATION PROPRIETY |
|---|---|---|
| 1 | SWITCH IDS COINCIDE AND PORT IDS COINCIDE | APPLICABLE |
| 2 | SWITCH IDS COINCIDE AND PORT IDS DO NOT COINCIDE | APPLICABLE |
| 3 | SWITCH IDS DO NOT COINCIDE AND PORT SETTINGS COINCIDE | APPLICABLE |
| 4 | OTHER THAN ABOVE | NOT APPLICABLE |

FIG. 12B

| DETERMINATION ORDER | DETERMINATION ITEM | APPLICATION PROPRIETY |
|---|---|---|
| 1 | SWITCH IDS COINCIDE AND PORT IDS COINCIDE | APPLICABLE |
| 2 | SWITCH IDS COINCIDE AND PORT IDS DO NOT COINCIDE | APPLICABLE |
| 3 | DESIGN SWITCH ID AND DETECTED SWITCH ID ARE PREDETERMINED IDS | APPLICABLE |
| 4 | OTHER THAN ABOVE | NOT APPLICABLE |

FIG. 13

| DETECTED SERVER ID | DETECTED NETWORK INTERFACE ID | DETECTED MAC ADDRESS | DETECTED SWITCH ID | DETECTED PORT ID | DESIGN SWITCH ID | DESIGN PORT ID | DESIGN PORT SETTING | APPLICATION PROPRIETY |
|---|---|---|---|---|---|---|---|---|
| 1 | BMC | f8:0f:41:f2:aa:50 | 1 | 2 | 1 | 2 | UntagVLAN:102, STP:off, LLDP:off | APPLICABLE |
| 1 | LAN1 | f8:0f:41:f2:02:12 | 3 | 2 | 2 | 2 | UntagVLAN:202, TagVLAN:302, STP:off, LLDP:off | APPLICABLE |
| 1 | LAN2 | f8:0f:41:f2:02:13 | 2 | 2 | 3 | 2 | UntagVLAN:202, TagVLAN:302, STP:off, LLDP:off | APPLICABLE |
| 2 | BMC | f8:0f:41:f2:aa:4e | 1 | 1 | 1 | 1 | UntagVLAN:101, STP:off, LLDP:off | APPLICABLE |
| 2 | LAN1 | f8:0f:41:f2:01:3a | 3 | 1 | 2 | 1 | UntagVLAN:201, STP:off, LLDP:off | NOT APPLICABLE |
| 2 | LAN2 | f8:0f:41:f2:01:3b | 2 | 1 | 3 | 1 | UntagVLAN:301, STP:off, LLDP:off | NOT APPLICABLE |
| .. | .. | .. | .. | .. | .. | .. | .. | .. |

FIG. 14

| DETECTED SERVER ID | DETECTED NETWORK INTERFACE ID | DETECTED MAC ADDRESS | DETECTED SWITCH ID | DETECTED PORT ID | DESIGN SWITCH ID | DESIGN PORT ID | DESIGN PORT SETTING | APPLICATION PROPRIETY | SETTING STATE |
|---|---|---|---|---|---|---|---|---|---|
| 1 | BMC | f8:0f:41:f2:aa:50 | 1 | 2 | 1 | 2 | UntagVLAN:102, STP:off, LLDP:Off | APPLICABLE | SET |
| 1 | LAN1 | f8:0f:41:f2:02:12 | 3 | 2 | 2 | 2 | UntagVLAN:202, TagVLAN:302, STP:off, LLDP:Off | APPLICABLE | SET |
| 1 | LAN2 | f8:0f:41:f2:02:13 | 2 | 2 | 3 | 2 | UntagVLAN:202, TagVLAN:302, STP:off, LLDP:Off | APPLICABLE | SET |
| 2 | BMC | f8:0f:41:f2:aa:4e | 1 | 1 | 1 | 1 | UntagVLAN:101, STP:off, LLDP:Off | APPLICABLE | SET |
| 2 | LAN1 | f8:0f:41:f2:01:3a | 3 | 1 | 2 | 1 | UntagVLAN:201, STP:off, LLDP:Off | NOT APPLICABLE | ABNORMAL WIRE CONNECTION |
| 2 | LAN2 | f8:0f:41:f2:01:3b | 2 | 1 | 3 | 1 | UntagVLAN:301, STP:off, LLDP:Off | NOT APPLICABLE | ABNORMAL WIRE CONNECTION |
| .. | .. | .. | .. | .. | .. | .. | .. | .. | .. |

FIG. 15

| DESIGN SERVER ID | DESIGN NETWORK INTERFACE ID | DESIGN SWITCH ID | DESIGN PORT ID | DESIGN PORT SETTING |
|---|---|---|---|---|
| 1 | BMC | 1 | 2 | UntagVLAN:102, STP:off, LLDP:off |
| 1 | LAN1 | 3 | 2 | UntagVLAN:202, TagVLAN:302, STP:off, LLDP:off |
| 1 | LAN2 | 2 | 2 | UntagVLAN:202, TagVLAN:302, STP:off, LLDP:off |
| 2 | BMC | 1 | 1 | UntagVLAN:101, STP:off, LLDP:off |
| 2 | LAN1 | 2 | 1 | UntagVLAN:201, STP:off, LLDP:off |
| 2 | LAN2 | 3 | 1 | UntagVLAN:301, STP:off, LLDP:off |
| .. | .. | .. | .. | .. |

SETTING METHOD, SETTING DEVICE, AND STORAGE MEDIUM

CROSS-REFERENCE TO RELATED APPLICATION

This application is a continuation application of International Application PCT/JP2017/046677, filed on Dec. 26, 2017 and designated the U.S., the entire contents of which are incorporated herein by reference. The International Application PCT/JP2017/046677 is based upon and claims the benefit of priority of the prior Japanese Patent Application No. 2017-000616, riled on Jan. 5, 2017, the entire contents of which are incorporated herein by reference.

FIELD

The embodiment discussed herein is related to a setting method, a setting device, and a storage medium.

BACKGROUND

In a data center, for example, a plurality of servers, switches, and the like are installed. In a system including the plurality of servers, switches, and the like, physical wire connection is manually performed by an operator at the time of system construction based on pieces of information of design that have been specified in advance. After the operation of the physical wire connection, logical settings of the switches and the like are performed.

With the spread of cloud systems in recent years, the number of servers and switches installed in a data center or the like are increased.

As a related technique, a technique in which an administrative server generates connection information by acquiring physical and virtual connection of a calculator resource has been proposed (for example, see Japanese Laid-open Patent Publication No. 2013-97394). A technique of generating configuration information from an identifier of an information processing device or a network device and physical connection position of the network device has been proposed (for example, see Japanese Laid-open Patent Publication No. 2005-151107). A technique of calculating a communication amount by reading route information of a plurality of servers and a plurality of switches and wire connection information has been proposed (for example, see Japanese Laid-open Patent Publication No. 2010-220103).

As a related technique, a technique, in which when no logical path is present on a physical path of a computed route, a logical path is established on the physical path of the route, has been proposed (for example, see Japanese Laid-open Patent Publication No. 2013-247410). A technique of making an operation instruction to each of network equipment management devices based on association between a logical network and server information has been proposed (for example, see Japanese Laid-open Patent Publication No. 2014-225719).

The amount of work for the physical wire connection is increased as the number of servers or switches is increased. When establishment of a plurality of servers or a plurality of switches is manually performed as described above, possibility of erroneous physical wire connection is increased as the number of servers or switches is increased. In accordance with the number of erroneous physical wire connection, the amount of restoration work for the physical wire connection is increased. In view of the above-described matters, it is desirable to be able to perform system operation without restoring erroneous physical wire connection.

SUMMARY

According to an aspect of the embodiments, a non-transitory computer-readable storage medium storing a program that causes a computer to execute a process, the process includes detecting connection relationship between a server and a communication device that belong to a system to generate physical connection information indicating the connection relationship; referring to design information related to connection of the server and the communication device to compare the physical connection information and the design information to determine presence or absence of an error in the connection relationship; determining whether a predetermined setting corresponding to the design information is applicable to a port of the communication device corresponding to the connection relationship determined as erroneous; applying the predetermined setting to the port of the communication device to which the predetermined setting has been determined as applicable; and changing the design information related to the communication device to which the predetermined setting has been applied, based on the physical connection information.

The object and advantages of the invention will be realized and attained by means of the elements and combinations particularly pointed out in the claims.

It is to be understood that both the foregoing, general description and the following detailed description are exemplary and explanatory and are not restrictive of the invention.

BRIEF DESCRIPTION OF DRAWINGS

FIG. 3 is a diagram illustrating an example of design information related to a server and a network switch;

FIG. 4 is a diagram illustrating an example of initial setting information with respect to a port;

FIG. 7 is a diagram illustrating an example of a network detection list after BMC detection;

FIG. 8 is a diagram illustrating an example of network detection after NIC detection;

FIG. 9 is a diagram illustrating an example of interface information transmitted from the server;

FIG. 10 is a diagram illustrating an example of physical connection information;

FIG. 11 is a diagram illustrating an example of network's actual state information list;

FIG. 12A is a diagram illustrating a first example of a setting value application determination rule;

FIG. 12B is a diagram illustrating a second example of a setting value application determination rule;

FIG. 13 is a diagram illustrating an example of net network's actual state information list after addition of application propriety;

FIG. 14 is a diagram illustrating an example of a network's actual state information list after addition of a setting state;

FIG. 15 is a diagram illustrating an example of design information after change;

DESCRIPTION OF EMBODIMENTS

<Example of Overall Configuration of System According to Embodiment>

Figure 1:
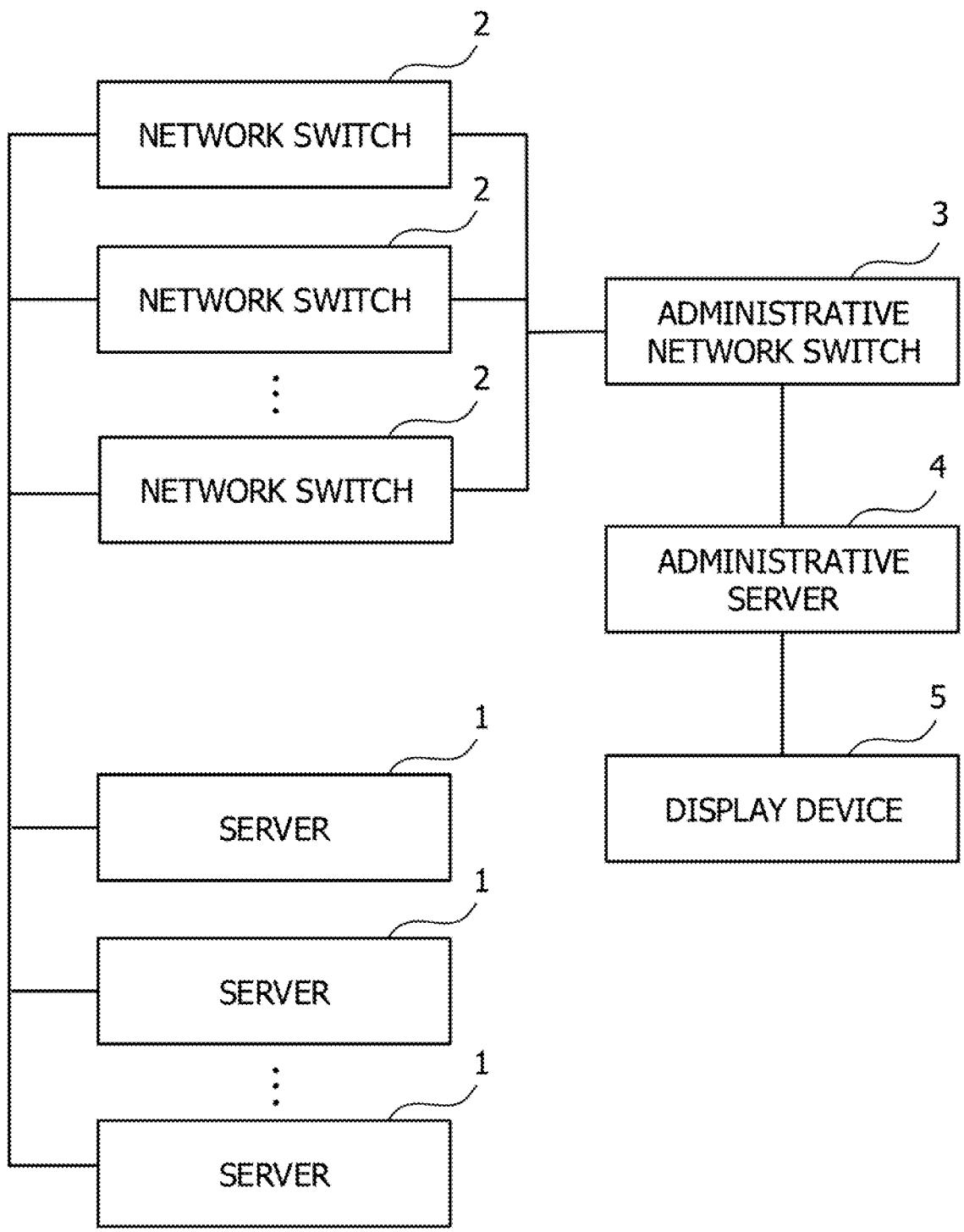
FIG. 1 is a diagram illustrating an example of an overall configuration of a system according to an embodiment.

Hereinafter, an embodiment will be described with reference to the drawings. FIG. 1 is a diagram illustrating an example of an overall configuration of a system according to an embodiment.

The system according to the embodiment includes a plurality of servers 1, a plurality of network switches 2, an administrative network switch 3, an administrative server 4, and a display device 5. The plurality of servers 1 are connected to the plurality of network switches 2. The plurality of network switches 2 are connected to the administrative network switch 3. The administrative server 4 is connected to the administrative network switch 3 and the display device 5.

The servers 1 and the network switches ray may be installed within one server rack, for example, instead of the plurality of servers 1, only one server 1 may be provided. Instead of the plurality of network switches 2, only one network switch 2 may be provided.

The servers 1 are physically connected to the network switches 2 through communication cables. In the description below, the servers 1 are to include one network interface using a baseboard management controller (BMC) and two network interface cards (NIC), as network interfaces.

In the description below, a network interface may be simply referred to as an interface. An interface using a BMC may be simply referred to as a BMC.

However, an interface for the servers 1 is not limited to a BMC or NIC, and other types of interfaces may be included. The number, of the interfaces for the servers 1 is not limited to that described above.

Each of the network switches 2 includes a plurality of ports. The ports of the network switches 2 are connected to the interfaces of the servers 1 (for example, the BMC and NICs) through communication cables. The network switches 2 are an example of communication devices. The communication devices may be other types of communication devices than the network switches 2.

The administrative network switch 3 is connected to the network switches 2 and the administrative server 4.

The administrative server 4 is able to perform communication with the servers 1 through the network switches 2 and the administrative network switch 3. In the description below, the administrative server 4 is to be a dynamic host configuration protocol (DHCP) server. However, apart from the administrative server 4, a DHCP server connected to the administrative server 4 may be installed.

The administrative server 4 is an example of a setting device. The administrative server 4 is an example of a computer.

The display device 5 displays determination results and the like output from the administrative server 4. The display device 5 displays a network's actual state information list which will be described later, for example. The display device 5 may be a display of a mobile terminal, for example. Alternatively, an information processing terminal may be connected between the administrative server 4 and the display device 5.

In the embodiment, physical wire connection between the servers 1 and the network switches 2 is assumed to be manually performed by an operator. The amount of work for the physical wire connection increases as the number of the servers 1 and the network switches 2 increases. For example, when the number of the installed servers 1 is 40 and the number of the installed network switches 2 is 3, 120 communication cables may be used to perform physical wire connection between the servers 1 and the network switches 2.

When erroneous connection has been found in the physical wire connection, an operation for physical wire connection and an operation for verifying presence or absence of an error are performed again. When the number of the physical wire connection is large, there is a higher possibility that an error occurs, and the amount of work for the operation for physical wire connection and the operation for verifying presence or absence of an error is increased.

The administrative server 4 thus determines whether a predetermined setting corresponding to design information is applicable to the network switch 2 with respect to a port that has been determined to have an error in the physical wire connection thereof. The predetermined setting is a communication setting with respect to the port, for example. The administrative server 4 then applies the predetermined setting to the port of the network switch 2 to which the predetermined setting has been determined to be applicable, thereby enabling to perform system operation without restoring physical wire connection.

<Example of Administrative Server>

Figure 2:
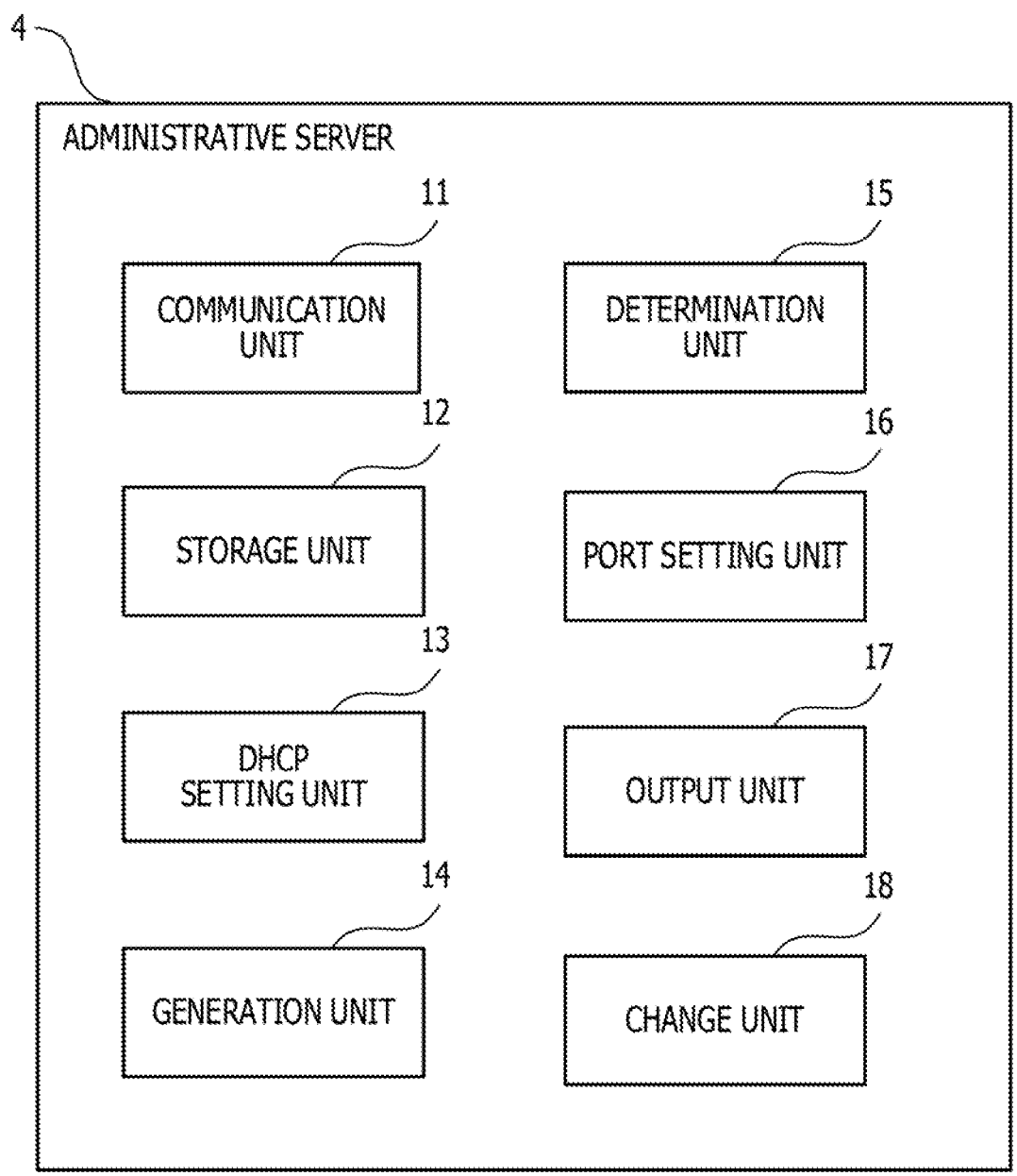
FIG. 2 is a diagram illustrating an example of administrative server.

FIG. 2 is a diagram illustrating an example of an administrative server. As illustrated in FIG. 2, the administrative server 4 includes a communication unit 11, a storage unit 12, a DHCP setting unit 13, a generation unit 14, a determination unit 15, a port setting unit 16, an output unit 17, and a change unit 18.

The communication unit performs transmission and reception of various types of information with the servers 1 through the network switches 2 and the administrative network switch 3.

The storage unit 12 stores therein design information related to the servers 1 and the network switches 2. The design information includes information related to connection of the servers 1 and the network switches 2 and information related to the predetermined setting to the ports of the network switches 2.

FIG. 3 is a diagram illustrating an example of design information related to a server and a network switch. As illustrated in FIG. 3, the design information related to the servers 1 and the network switches 2 includes a design server ID, a design network interface ID, a design switch ID, a design port ID, and a design port setting. ID is an abbreviation for identification.

The design server ID is information that identifies each of the servers 1. The design network interface ID is information that identifies an interface of the server 1. In the example illustrated in FIG. 3, BMC and IDs of NIC (LAN1, LAN2) correspond to the design network interface ID.

The design switch ID is information that identifies each of the network switches 2. The design port ID is information that identifies the port of the network switch 2. The design information in the example in FIG. 3 indicates that the interface of the server 1 indicated by the design network interface ID and the port of the network switch 2 indicated by the design switch ID, and the design port ID on the same row are connected through a communication cable.

The design port setting indicates a communication setting with respect to the port indicated by the design port ID on the same row.

FIG. 4 is a diagram illustrating an example of initial setting information with respect to a port. The information illustrated in FIG. 4 is initial setting information with respect to each port of the network switches 2. In the example illustrated in FIG. 4, virtual local area network (VLAN) ID is the setting information to the port.

The port setting unit 16 sets a VLAN ID to each port mounted on each of the network switches 2 based on initial setting information as illustrated in FIG. 4.

Figure 5:
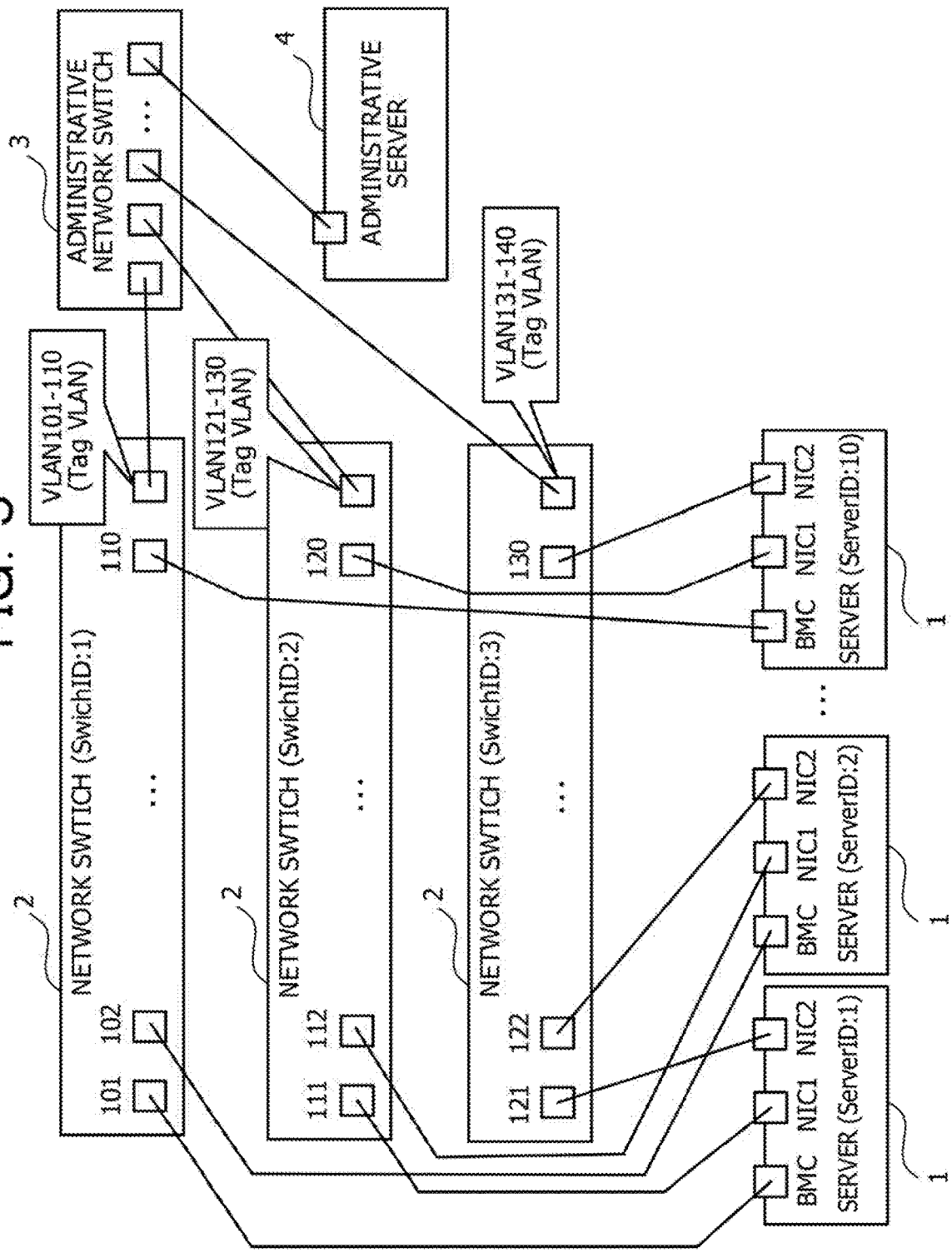
FIG. 5 is a diagram illustrating a connection state between the server and the network switch.

FIG. 5 is a diagram illustrating a connection state between the server and the network switch. FIG. 5 illustrates an example of connection relationship between each interface of the servers 1 and each port of network switches 2. FIG. 5 illustrates an example of connection relation between each port of the network switches 2 and each port of the administrative network switch 3. FIG. 5 illustrates an example of connection, relationship between the administrative network switch 3 and the administrative server 4.

In FIG. 5, for each interface of the servers 1, the design network interface ID is indicated. For example, in the example in FIG. 5, BMC, NIC1, and NIC2 are the design network interface ID.

In FIG. 5, for each port of the network switches 2, a VLAN ID is indicated. The VLAN ID is an initially set WAN ID, and for example, "101" and "102" are the VLAN ID.

As illustrated in FIGS. 4 and 5, the port setting unit 16 sets a different VLAN ID to each of the ports of the network switches 2. The port setting unit 16 sets the VLAN IDs to the port connected to the administrative network switch 3, out of the ports of the network switches 2, such that all VLAN IDs of the network switches 2 are included.

Out of the ports of the network switches 2, the port connected to the administrative network switch 3 is to be a tagged port to which a tag is added. Other ports are to be untagged ports to which no tag is added.

As described above, the administrative server 4 according to the present embodiment is a DHCP server. The DHCP setting unit 13 of the administrative server 4 leases an IP address in response to a request from the servers 1. For example, the DHCP setting unit 13 leases an IP address using a subnet corresponding to the VLAN ID to each port of the network switches 2.

When a server 1 is connected to the power source to be energized, the BMC issues a DHCP request to the DHCP server (administrative server 4). The DHCP setting unit 13 leases an IP address to the BMC in response to the DHCP request. The DHCP setting unit 13 causes the storage unit 12 to store therein lease information including a MAC address of the BMC and the IP address given to the BMC. The lease information is information related to the given IP address.

Figure 6:
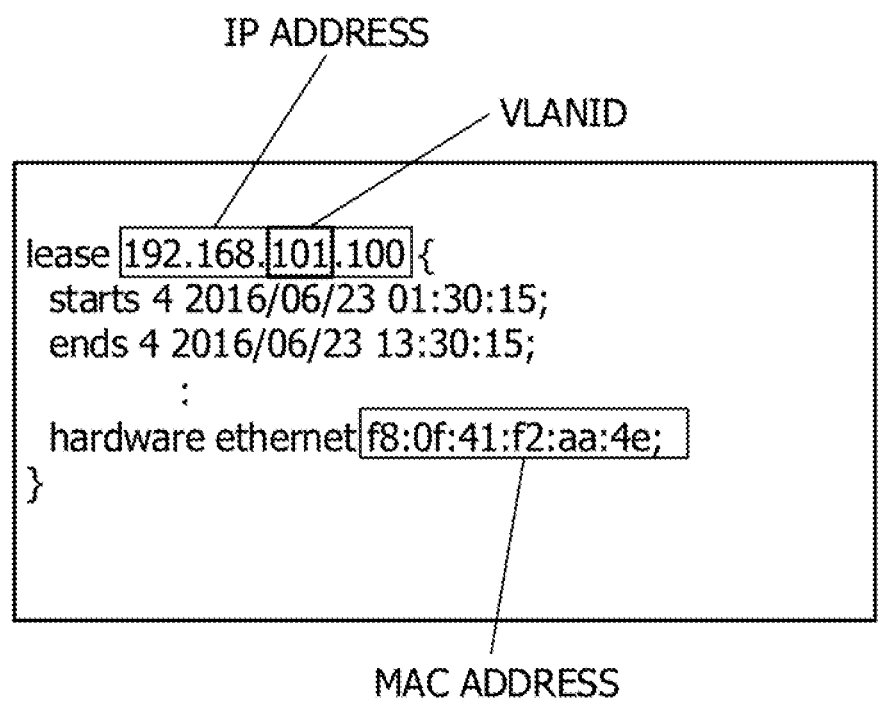
FIG. 6 is a diagram illustrating an example of lease information.

FIG. 6 is a diagram illustrating an example of lease information. The lease information as illustrated in FIG. 6 is generated for each interface of the servers 1. As illustrated in FIG. 6, the lease information includes the IP address given to the interface of the server 1 and the MAC address.

As illustrated in FIG. 6, the IP address is set so as to include an initially set VLAN ID with respect to the port. In the example in FIG. 6, "101" corresponds to the VLAN ID.

The generation unit 14 generates physical connection information indicating connection relationship by detecting connection relationship between the servers 1 and the network switches 2 that belong to the system. Procedures for the generation unit 14 to generate the physical connection information will be described below.

As illustrated in FIG. 6, the lease information includes the initially set VLAN ID with respect to the port and the MAC address of the interface of the server 1. The generation unit 14 searches for the initial setting information in FIG. 4 using the VLAN ID included in the lease information and extracts the switch ID and the port ID of the network switch 2 corresponding to the VLAN ID. The generation unit 14 acknowledges the extracted switch ID and port ID of the network switch 2 and that the interface of the server 1 indicated by the MAC address in the lease information is connected.

The generation unit 14 generates a network detection list associating the IP address and the MAC address of each of the interfaces of the servers 1 with the switch ID and port ID of the network switch 2 connected to the each of the interfaces.

FIG. 7 is a diagram illustrating an example of network detection list after BMC detection. As illustrated in FIG. 7, the network detection list is a list in which the MAC address and the lease IP address of each of the interfaces of the servers 1 are associated with the switch ID and port ID of the network switch 2 connected to the each of the interfaces. The interface indicated by the MAC address of the server 1 in FIG. 7 is BMC.

Next, once the server 1 has been activated, when the operating system (OS) is activated, a DHCP request is issued from each NIC to the DHCP server (administrative server 4). The administrative server 4 may perform an intelligent platform management interface (IPMI) operation and thereby automatically activate the servers 1, for example.

The administrative server 4 may use a network boot environment by preboot execution environment (PXE) to automatically perform OS activation and NIC setting (DHCP specification) of the servers 1.

As at the time of leasing an IP address to the BMC, lease information related to the NIC interface is stored in the storage unit 12. Based on the lease information, the generation unit 14 adds information associating the IP address and the MAC address of the NIC interface with the switch ID and the port ID of the network switch 2, in the network detection list.

FIG. 8 is a diagram illustrating an example of network detection list after NIC detection. The network detection list illustrated in FIG. 8 is a list in which detection information related to the NIC interface is added to the network detection list illustrated in FIG. 7. In FIG. 8, the MAC address and the lease IP address of the NIC interface are recorded in a manner associated with the detected switch ID and the port ID.

Each of the servers 1 transmits the interface information indicating a network interface ID and the MAC address of the BMC and each NIC to the administrative server 4 after OS activation. The administrative server 4 may use the network boot environment by PXE to automatically acquire the interface information of each of the servers 1.

FIG. 9 is a diagram illustrating an example of interface information transmitted from the server. As illustrated in FIG. 9, the interface information transmitted from the server 1 is information associating the network interface ID and the MAC address of each interface.

The generation unit 14 generates physical connection information indicating connection relationship between each interface of the server 1 and each port of the network switch 2 based on the network detection list and the interface information transmitted from the server 1. The generation unit 14 combines the network detection list illustrated in FIG. 8 and the interface information illustrated in FIG. 9 using the MAC address as a key and thereby generates the physical connection information, for example.

FIG. 10 is a diagram illustrating an example of physical connection information. The physical connection information illustrated in FIG. 10 is a list which the rows of the network detection list illustrated in FIG. 8 and the rows of the interface information illustrated in FIG. 9 that have the same MAC address are combined with each other. The generation unit 14 allocates an optional server ID to each server (a detected server ID in FIG. 10).

Next, the generation unit 14 generates the network's actual state information list in which the design information and the physical connection information are combined. The generation unit 14 associates the detected server ID and the design server ID such that the detected switch ID and the detected port ID coincide with the design switch ID and the design port ID with respect to the BMC, to generate the networks actual state information list, for example.

The generation unit 14 may associate the detected server ID and the design server ID such that the detected switch ID and the detected port ID coincide with the design switch ID and the design port ID with respect to the LAN1 or the LAN2, for example.

FIG. 11 is a diagram illustrating an example of a network's actual state information list. The network's actual state information list illustrated in FIG. 11 combines the design information and the physical connection information as described above. For example, in the network's actual state information list illustrated in FIG. 11, the design information related to the design server ID "1" and the physical connection information related to the detection server ID "2" are combined. In the network's actual state information list, the design information related to the design server ID "2" and the physical connection information related to the detected server ID "1" are combined.

The generation unit 14 performs above-described processing and thereby generates the network's actual state information list in which the physical connection information is combined with the design switch ID, the design port ID, and the design port setting in the design information.

The determination unit 15 compares the design information and the physical connection information to determine presence or absence of an error in the connection relationship, based on the network's actual state information list.

The determination unit 15 determines that no error is occurring in the connection relationship when, in the network's actual state information list illustrated in FIG. 11, the corresponding design switch ID and detected switch ID coincide with each other and the corresponding design port ID and the detected port ID coincide with each other, for example.

The determination unit 15 determines that an error is occurring when, in the network's actual state information list illustrated in FIG. 11, the corresponding design switch ID and detected switch ID do not coincide with each other, for example. The determination unit 15 determines that an error is occurring when, in the network's actual state information list illustrated in FIG. 11, the corresponding design port ID and detected port ID do not coincide with each other.

The determination unit 15 determines whether the predetermined setting corresponding to the design information (design port setting) is applicable to the port of the network switch 2 that corresponds to the connection relationship determined as erroneous, based on a predetermined rule. The predetermined rule is a setting value application determination rule, for example, which will be described later.

FIG. 12A is a diagram illustrating a first example of a setting value application determination rule. The setting value application determination rule illustrated in FIG. 12A includes the determination order, determination items, and application propriety. The setting value application determination rule illustrated in FIG. 12A indicates that the determination is performed in the order of values presented in the determination order.

The rule of the determination order "1" in FIG. 12A indicates that when the corresponding design switch ID and detected switch ID coincide with each other and the corresponding design port ID and detected port ID coincide with each other, the application propriety determination result of the design port setting is "applicable".

The rule of the determination order "2" in FIG. 12A indicates that when the corresponding design switch ID and detected switch ID coincide with each other and the corresponding design port ID and detected port ID do not coincide with each other, the application propriety determination result of the design port setting is "applicable".

When it is possible to normally perform communication if the port position is different but within the same switch, by using the rule of the determination order "2", the port setting unit 16 applies the design port setting to the network switch 2, as described later. The system operation is possible without restoring the physical wire connection, enabling to reduce the amount of work for the physical wire connection.

The rule of the determination order "3" in FIG. 12A indicates that when the design switch ID and detected switch ID do not coincide with each other and the predetermined setting (design port setting) coincides, the application propriety of the design port setting is "applicable".

The determination unit 15 determines whether the design port setting of a first port corresponding to a first interface in the design information coincides with the design port setting of a second port corresponding to a second interface in the design information. For example, the determination unit 15 may compare a character string of the design port setting of the first port with that of the second port and determines whether the character strings coincide with each other.

When the above-described determination indicates coincidence and the physical connection information indicates that the second port is actually connected to the first interface and the first port is actually connected to the second interface, the determination unit 15 determines that the above-described design port setting is applicable to the first port and the second port.

A specific example of the rule of the determination order "3" will be described. For example, in FIG. 11, an interface whose detected server ID is 1 and whose detected network interface ID is LAN1 is defined as the first interface. The design port setting of a port (defined as the first port) whose design switch ID is "2" and whose design port ID is "2", that corresponds to the first interface in the design information, is "UntagVLAN:202, TagVLAN:302, STP:off, LLDP:off".

In FIG. 11, an interface whose detected server ID is "1" and whose detected network interface ID is "LAN2" is defined as the second interface.

In the design information, the design port setting of a port (defined as the second port) whose design switch ID is "3" and whose design port ID is "2", that corresponds to the second interface, is "UntagVLAN:202, TagVLAN:302, STP:off, LLDP:off". That is to say, the design port setting of the first port and that of the second port coincide with each other, for example.

As illustrated in the part of the physical connection information in FIG. 11, the second port is connected to the first interface and the first port is connected to the second interface. In the above-described case, the determination unit 15 determines that the coinciding design port setting is applicable to each of the first port and the second port.

FIG. 12B is a diagram illustrating a second example of a setting value application determination rule. The setting value application determination rule illustrated in FIG. 12B includes the determination order, determination items, and application propriety. The setting value application determination rule illustrated in FIG. 12B indicates that the determination is performed in the order of values presented in the determination order.

The rule of the determination order "1" and the determination order "2" in FIG. 12B is the same as the first rule illustrated in FIG. 12A.

The rule of the determination order "3" in FIG. 12B indicates that when the corresponding design switch ID and detected switch ID are included in a plurality of predetermined IDs, the application propriety determination result of the design port setting is "applicable". That is to say, even when the design switch ID and the detected switch ID are different from each other, if both of these switch IDs are included in the predetermined IDs the application propriety determination result is "applicable", for example.

In the rule of the determination order "3", the plurality of predetermined IDs are set in advance. For example, when the predetermined IDs are "2" and "3", the design switch ID is 2, and the detected switch ID is 3, the determination result is "applicable".

That is to say, the determination unit 15 refers to the ID of the network switch 2 (defined as a first communication device) corresponding to a predetermined interface of the server 1 in the design information, for example. The determination unit 15 refers to the ID of the network switch 2 (defined as a second communication device) that is indicated as connected to the predetermined interface of the server 1 in the physical connection information. When each of the referred IDs are included in the plurality of predetermined IDs, the determination unit 15 determines that the predetermined setting corresponding to the design information is applicable to the ports of the first communication device and the second communication device.

For example, even when the network switch 2 indicated by the design switch ID and the network switch 2 indicated by the detected switch ID are different network switches 2, if these network switches 2 belong to the same segment, communication is able to be normally performed in some cases. A segment represents a group preset for each device within the network. For example, when the same network address is given to devices, it means that the devices belong to the same segment.

As described above, by using the setting value application determination rule, the design port setting is applied to the network switch 2 that has been determined as applicable. That is to say, with consideration for an error in the physical wire connection a setting using logical design information is performed, for example. Accordingly, with the setting device in the present embodiment, an error in the physical connection is relieved by a change in the logical settings. With this, the system operation is possible without restoring the physical wire connection, enabling to reduce the amount of work for the physical wire connection.

The determination unit 15 may use different setting value application determination rules depending on the system environment, for example. The setting value application determination rule to be used may be specified by a user in advance, for example.

After determining whether the predetermined setting corresponding to the design information (design port setting) is applicable based on the predetermined rule (setting value application determination rule), the determination unit 15 causes the storage unit 12 to store therein the determination result.

FIG. 13 is a diagram illustrating an example of a network's actual state information list after addition of application propriety. The network's actual state information list illustrated in FIG. 13 is a list in which application propriety items indicating application propriety of the design port setting are added to the network's actual state information list illustrated in FIG. 11. FIG. 13 illustrates a result obtained by a determination based on a first example of the setting value application determination rule (in FIG. 12A).

The port setting unit 16 applies the predetermined setting (design port setting) to the network switch 2 to which the predetermined setting has been determined as applicable.

The port setting unit 16 sets the design port setting of an item for which the application propriety is "applicable" in FIG. 13 to the corresponding port, for example. The port corresponding to the design port setting is a port indicated by the detected switch ID and the detected port ID described on the same row as that of the design port setting in FIG. 13.

The port setting unit 16 adds the setting, state to the item for which the port setting has been performed in the network's actual state information list.

FIG. 14 is a diagram illustrating an example of a network's actual state information list after addition of a setting state. The port setting unit 16 adds a result of "set" to the setting state of an item for which the port setting has been performed. The port setting unit 16 adds a result of "abnormal wire, connection" to the setting state of an item for which the port setting has not been performed.

The output unit 17 outputs the network's actual state information list after addition of the setting state illustrated in FIG. 14 to the display device 5 and causes the display device 5 to display the output network's actual state information list. The output unit 17 causes the display device 5 to display the network's actual state information list and thereby causes display of a content indicating whether the predetermined setting corresponding to the design information is applicable to the network switch 2 in the item that has been determined as erroneous by the determination.

The output unit 17 may cause the display device 5 to display each information illustrated in FIGS. 3, 4, and 6 to 13, for example.

The output unit 17 causes the display device 5 to display the network's actual state information list after addition of the setting state and thereby enables to notify the operator of whether restoration of the physical connection is demanded. For an item for which the setting state is "abnormal wire connection" in FIG. 14, restoration of physical connection is performed by the operator, for example.

The change unit 18 changes the design information with respect to the item that has been determined to have an error in the connection relation but has been applied with the predetermined setting corresponding to the design information (design port setting).

FIG. 15 is a diagram illustrating an example of design information after change. The design information in FIG. 15 is information in which the network's actual state information list in FIG. 14 is reflected on the design information in FIG. 3. The design server ID in FIG. 15 has been changed based on the detected server ID in FIG. 14. The items with underlines in FIG. 15 are items after change.

In FIG. 14, with respect to an item for which an error is present between the design information and the physical connection information and the setting state is "set", the design information has been changed based on the physical connection information.

For example, the design switch ID for which the detected server ID is "1" and the detected network interface ID is "LAN1" has been changed from "2" to "3". The design switch ID for which the detected server ID is "1" and the detected network interface ID is "LAN2" has been changed from "3" to "2".

The change unit 18 may change the design information stored in advance and may store new design information apart from the design information stored in advance.

As described above, the change unit 18 changes the design information and thus enables to reduce generation of errors when the connection relationship is detected again and determination of an error is performed.

<Example of Processing Flow According to Embodiment>

Figure 16:
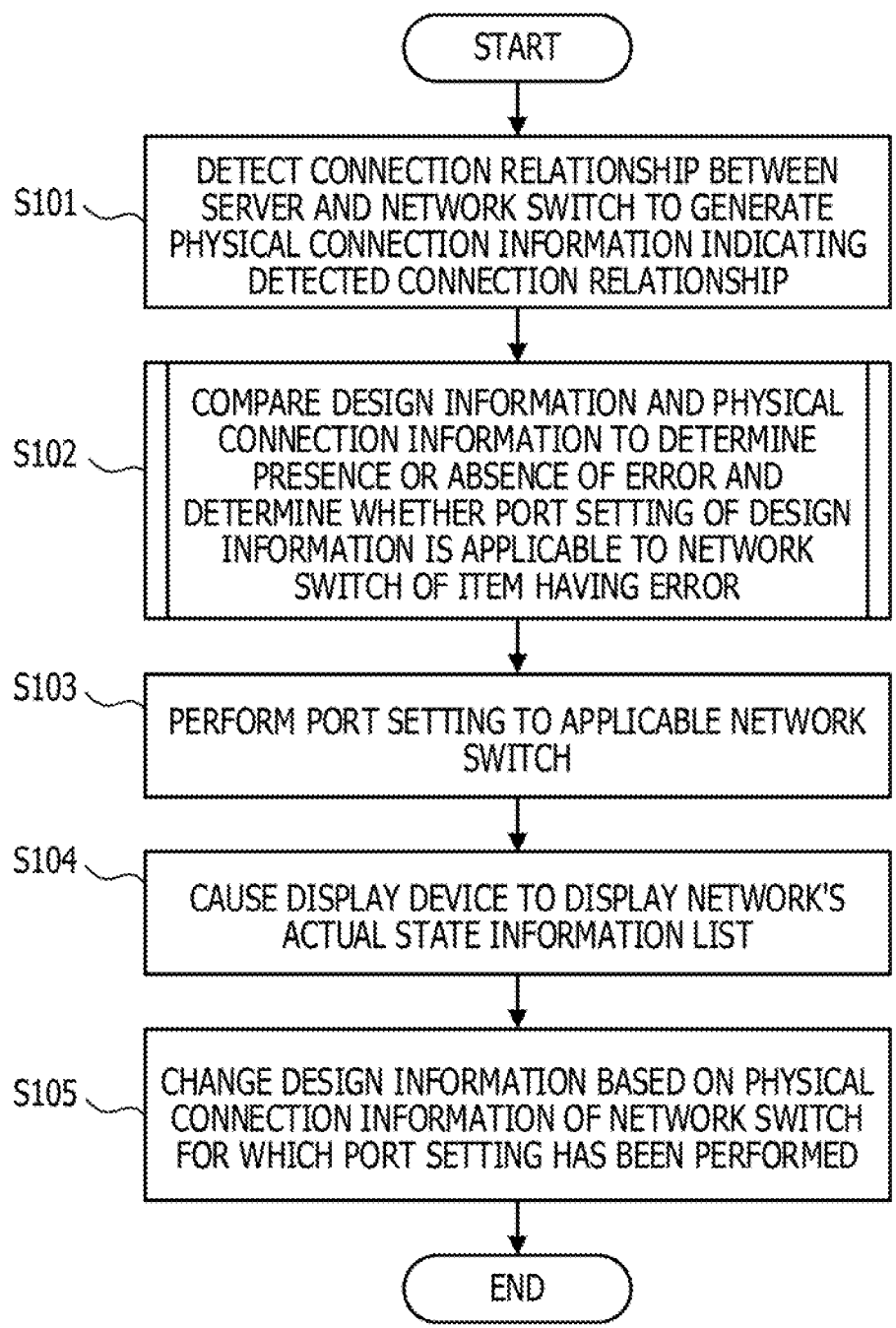
FIG. 16 is a flowchart illustrating an example of processing flow according to the embodiment.

FIG. 16 is a flowchart illustrating an example of processing flow according to the embodiment. The generation unit 14 detects connection relationship between the servers 1 and network switches 2 that belong to the system to generate physical connection information indicating the connection relationship (S101).

At S101, the generation unit 14 uses the lease information obtained by the DHCP setting unit 13 setting an IP address to the interface of the server 1 to detect the connection relationship between the server 1 and the network switch 2, for example. The physical connection information is the information illustrated in FIG. 10, for example.

The determination unit 15 refers to the design information stored in the storage unit 12, compares the design information and the physical connection information to determine presence or absence of an error, and determines whether the predetermined setting of the design information (design port setting) is applicable to the network switch 2 of the item having an error (S102).

At S102, the determination unit 15 determines that no error is occurring in the connection relationship when the design switch ID and the detected switch ID coincide with each other and the design port ID and the detected port ID coincide with each other in the network's actual state information list illustrated in FIG. 11, for example.

At S102, the determination unit 15 determines whether the predetermined setting of the design information (design port setting) is applicable based on the setting value application determination rule illustrated in FIG. 12A or FIG. 12B.

The port setting unit 16 applies the design port setting to the port of the network switch 2 that is applicable (S103). The port setting unit 16 sets the design port setting of the item for which the application propriety is "applicable" in FIG. 13 to the corresponding port, for example.

The output unit 17 causes the display device 5 to display a content indicating whether the port setting corresponding to the design information is applicable to the port corresponding to the connection relationship determined as erroneous by the determination at S102 (S104). The output unit 17 outputs the network's actual state information list illustrated in FIG. 14 to the display device 5 and causes the display device 5 to display the output network's actual state information list, for example.

The change unit 18 changes the design information based on the physical connection information of the network switch 2 for which the port setting has been performed (S105). The change unit 18 changes the design information based on the physical connection information as illustrated in FIG. 15, for example.

<Example of Low in First Example of Determination Processing>

Figure 17:
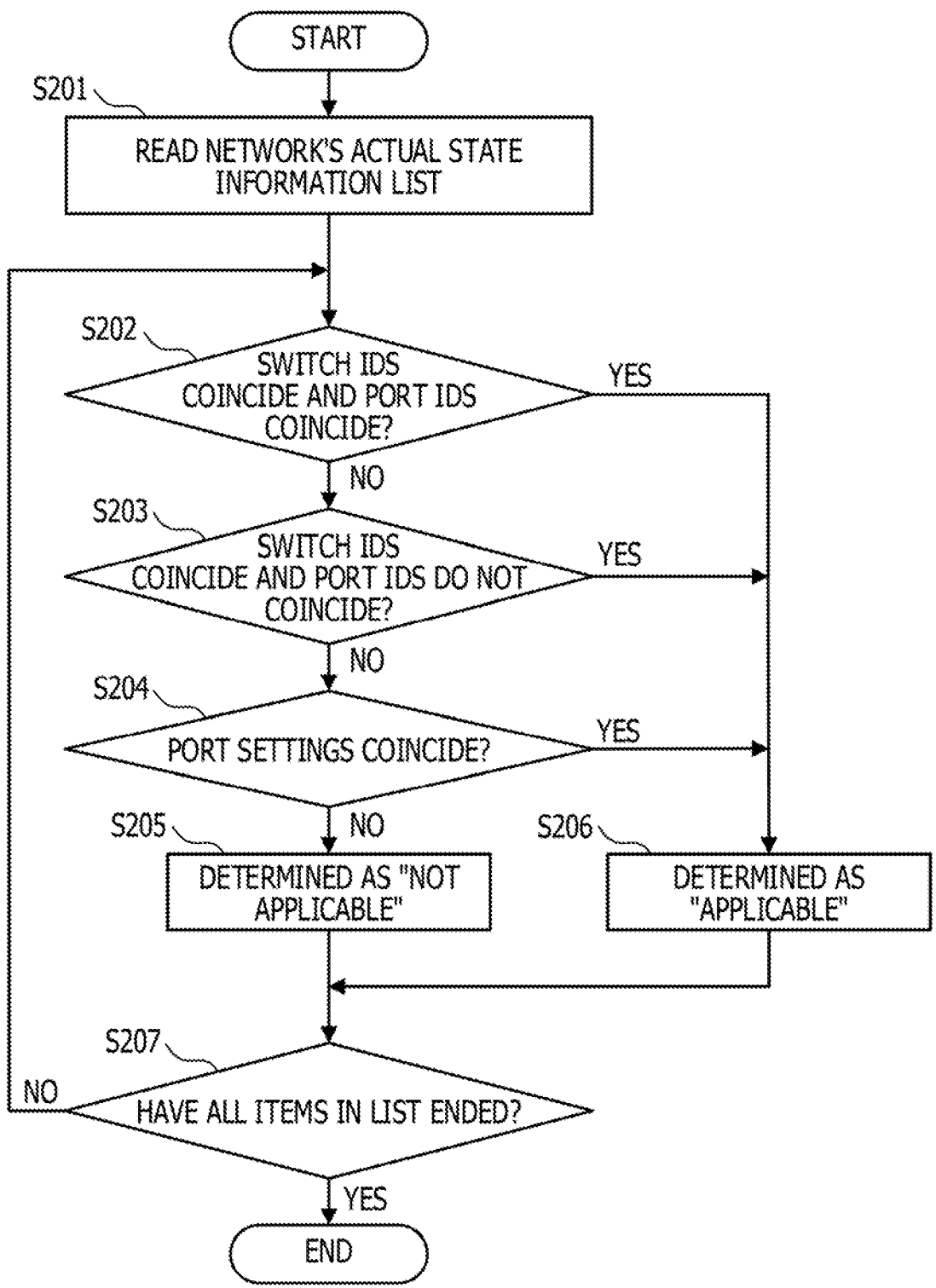
FIG. 17 is a flowchart illustrating a first example of S102 in FIG. 16.

FIG. 17 is a flowchart illustrating a first example of S102 in FIG. 16. The flowchart illustrated in FIG. 17 corresponds to the setting value application determination rule illustrated in FIG. 12A.

The determination unit 15 reads the network's actual state information list associating the design information and the physical connection information (for example, FIG. 11) (S201).

The determination unit 15 determines whether the design switch ID and the detected switch ID coincide with each other and the design port ID and the detected port ID coincide with each other with respect to the port of the network switch 2 to be connected to the predetermined interface of the server 1 (S202).

In the case of No at S202, the processing proceeds to S203. The determination unit 15 compares the design information and the physical connection information with respect to the port of the network switch 2 to be connected to the predetermined interface of the server 1 and determines whether the switch IDs coincide and the port IDs do not coincide (S203).

In the case of No at S203, the determination unit 15 determines whether the corresponding port settings coincide (S204). The determination unit 15 determines the design port setting of the first port corresponding to the first interface in the design information and the design port setting of the second port corresponding to the second interface in the design information coincide with each other. When the above-described determination indicates coincidence and the physical connection information indicates that the second port is connected to the first interface and the first port is connected to the second interface, the determination unit 15 determines that the above-described design port setting is applicable to the first port and the second port.

In the case of No at S204, the determination unit 15 determines that the application propriety of the design port setting is "not applicable" (S205).

In the case of Yes at any of S202 to S204, the determination unit 15 determines that the application propriety of the design port setting is "applicable" (S206).

When the determination has ended for all the items in the network's actual state information list (Yes at S207), the determination unit 15 ends the processing. When the determination has not ended for any of the items in the network's actual state information list (No at S207), the determination unit 15 returns to the processing at S202.

<Example of Flow in Second Example of Determination Processing>

Figure 18:
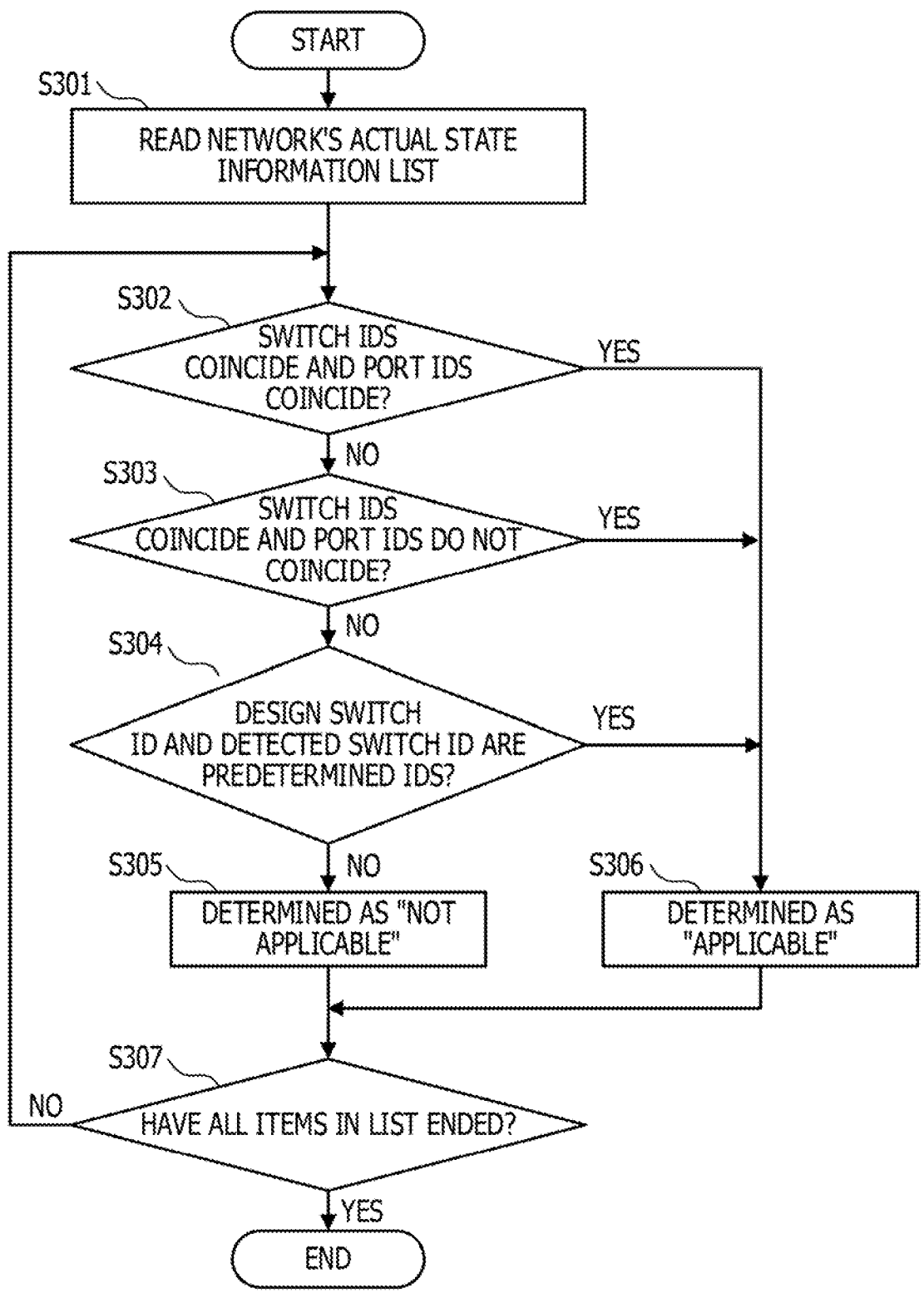
FIG. 18 is a flowchart illustrating a second example of S102 in FIG. 16.

FIG. 18 is a flowchart illustrating a second example of S102 in FIG. 16. The flowchart illustrated in FIG. 18 corresponds to the setting value application determination rule illustrated in FIG. 12B. In FIG. 18, S301 to S303 and S305 to S307 are the same as S201 to S203 and S205 to S207, and part of the description will be omitted.

The determination unit 15 determines whether the design switch ID corresponding to the predetermined interface of the server 1 in the design information and the detected switch ID indicated as connected to the predetermined interface in the physical connection information are included in the plurality of predetermined IDs (S304).

In the case of No at S304, the determination unit 15 determines the application propriety of the design port setting as "not applicable" (S305).

In the case of Yes at S304, the determination unit 15 determines the application propriety of the design port setting as "applicable" (S306). That is to say, even when the design switch ID and the detected switch ID are different from each other, if both of these switch IDs are included in the predetermined IDs the application propriety determination result is "applicable", for example.

The determination unit 15 may use processing in which the processing at S102 in FIG. 16 is combined with the first example illustrated in FIG. 17 and the second example illustrated in FIG. 18. For example, the determination unit 15 may perform the processing at S304 in the case of No in the processing at S204 illustrated in FIG. 17.

As described above, even when an error is present in the physical connection information, if it is determined that the predetermined setting corresponding to the design information is applicable based on the predetermined rule, the administrative server 4 (setting device) applies the predetermined setting.

An error in the physical wire connection may be generated with a communication cable inserted to an adjacent port of the same network switch 2, for example. However, if the error is caused only by the wrong port of the same network switch 2, for example, it is possible to handle the error only by changing the logical setting.

Accordingly, the setting device according to the present embodiment relieves an error in the physical connection by changing a logical setting. With this, the system operation is possible without restoring the physical wire connection, enabling to reduce the amount of work for the physical wire connection.

<Example of Hardware Configuration of Setting Device>

Figure 19:
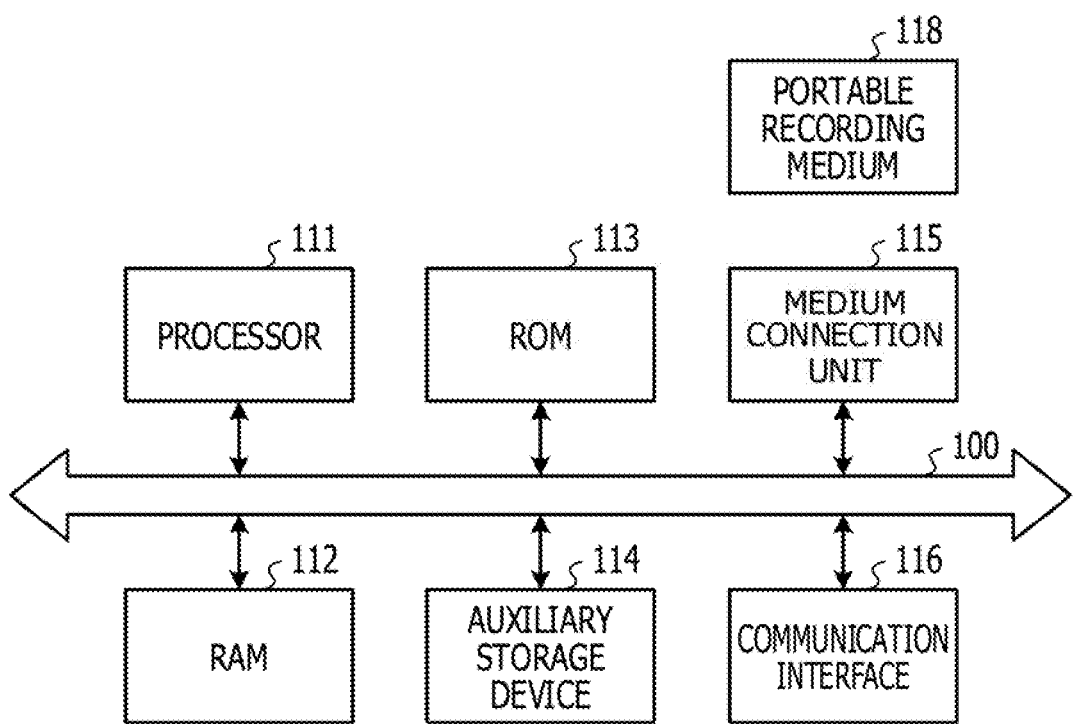
FIG. 19 is a diagram illustrating are example of a hardware configuration of a setting device.

Next, with reference to the example in FIG. 19, an example of a hardware configuration of the administrative server 4 (setting device) will be described. As illustrated in the example in FIG. 19, a processor 111, a random access memory (RAM) 112, and a read only memory (ROM) 113 are connected, to a bus 100. An auxiliary storage device 114, a medium connection unit 115, and a communication interface 116 are connected to the bus 100.

The processor 111 executes a program developed in the RAM 112. As the program to be executed, a setting program that performs processing in the embodiment may be applied.

The ROM 113 is a non-volatile storage device that stores therein the program developed in the RAM 112. The auxiliary storage device 114 is a storage device that stores therein various types of information. For example, a hard disk drive, a semiconductor memory, or the like may be applied to the auxiliary storage device 114. The medium connection unit 115 is provided in a connectable manner to a portable recording medium 118.

As the portable recording medium 118, a portable memory, an optical disc (for example, a compact disc (CD) or a digital versatile disc (DVD)), a semiconductor memory, or the like may be applied. In this portable recording medium 118, the setting program that performs the processing in the embodiment may be recorded.

The storage unit 12 illustrated in FIG. 2 may be implemented by the RAM 112, the auxiliary storage device 114, or the like. The communication unit 11 illustrated in FIG. 2 may be implemented by the communication interface 116. The DHCP setting unit 13, the generation unit 14, the determination unit 15, the port setting unit 16, the output unit 17, and the change unit 18 illustrated in FIG. 2 may be implemented by the processor 111 executing a given setting program.

Each of the RAM 112, the ROM 113, the auxiliary storage device 114, and the portable recording medium 118 is an example of a computer-readable tangible storage medium. These tangible storage media are not transitory media such as a signal carrier.

All examples and conditional language provided herein are intended for the pedagogical purposes of aiding the reader in understanding the invention and the concepts contributed by the inventor to further the aft, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

detecting connection relationship between a server and a communication device that belong to a system to generate physical connection information indicating the connection relationship;

referring to design information related to connection of the server and the communication device to compare the physical connection information and the design information to determine presence or absence of an error in the connection relationship;

determining whether a predetermined setting corresponding to the design information is applicable to a port of the communication device corresponding to the connection relationship determined as erroneous;

applying the predetermined setting to the port of the communication device to which the predetermined setting has been determined as applicable; and changing the design information related to the communication device to which the predetermined setting has been applied, based on the physical connection information, the predetermined setting of a first port of the communication device corresponding to a first interface of the server in the design information coincides with the predetermined setting of a second port of the communication device corresponding to a second interface of the server in the design information, and the process further comprises, when the physical connection information indicates that the second port is connected to the first interface and the first port is connected to the second interface, determining that the predetermined setting is applicable to the first port and the second port.

2. The storage medium according to claim 1, wherein the process further comprises causing a display device to display information indicating whether the predetermined setting corresponding to the design information is applicable to the port of the communication device corresponding to the connection relationship determined as erroneous.

3. The storage medium according to claim 1, wherein the process further comprises
comparing the design information and the physical connection information with respect to the port of the communication device to be connected to a predetermined interface of the server; and
when pieces of identification information of the communication device coincide and pieces of identification information of the port of the communication device do not coincide, determining that the predetermined setting corresponding to the design information is applicable to the port.

4. The storage medium according to claim 1, wherein the process further comprises when identification information of a first communication device corresponding to the predetermined interface of the server in the design information and identification information of a second communication device indicated as connected to the predetermined interface of the server in the physical connection information are included in a plurality of pieces of predetermined identification information, determining that the predetermined setting corresponding to the design information is applicable to ports of the first communication device and the second communication device.

5. The storage medium according to claim 1, wherein the physical connection information is a list in which first rows of a network detection list and second rows of interface information that have a same media access control (MAC) address are combined with each other.

6. A setting method executed by a processor included in a setting device, the setting method comprising:
detecting connection relationship between a server and a communication device that belong to a system to generate physical connection information indicating the connection relationship;
referring to design information related to connection of the server and the communication device to compare the physical connection information and the design information to determine presence or absence of an error in the connection relationship;
determining whether a predetermined setting corresponding to the design information is applicable to a port of the communication device corresponding to the connection relationship determined as erroneous;
applying the predetermined setting to the port of the communication device to which the predetermined setting has been determined as applicable; and
changing the design information related to the communication device to which the predetermined setting has been applied, based on the physical connection information,
the predetermined setting of a first port of the communication device corresponding to a first interface of the server in the design information coincides with the predetermined setting of a second port of the communication device corresponding to a second interface of the server in the design information, and
the setting method further comprises, when the physical connection information indicates that the second port is connected to the first interface and the first port is connected to the second interface, determining that the predetermined setting is applicable to the first port and the second port.

7. A setting device comprising:
a memory; and
a processor coupled to the memory and configured to:
detect connection relationship between a server and a communication device that belong to a system to generate physical connection information indicating the connection relationship,
refer to design information related to connection of the server and the communication device to compare the physical connection information and the design information to determine presence or absence of an error in the connection relationship,
determine whether a predetermined setting corresponding to the design information is applicable to a port of the communication device corresponding to the connection relationship determined as erroneous,
apply the predetermined setting to the port of the communication device to which the predetermined setting has been determined as applicable, and
change the design information related to the communication device to which the predetermined setting has been applied, based on the physical connection information,
the predetermined setting of a first port of the communication device corresponding to a first interface of the server in the design information coincides with the predetermined setting of a second port of the communication device corresponding to a second interface of the server in the design information, and
the processor is configured to
when the physical connection information indicates that the second port is connected to the first interface and the first port is connected to the second interface, determine that the predetermined setting is applicable to the first port and the second port.

8. The setting device according to claim 7, wherein the processor is configured to cause a display device to display information indicating whether the predetermined setting corresponding to the design information is applicable to the port of the communication device corresponding to the connection relationship determined as erroneous.

9. The setting device according to claim 7, wherein the processor is configured to:
compare the design information and the physical connection information with respect to the port of the communication device to be connected to a predetermined interface of the server; and
when pieces of identification information of the communication device coincide and pieces of identification information of the port of the communication device do not coincide, determine that the predetermined setting corresponding to the design information is applicable to the port.

10. The setting device according to claim 7, wherein the processor is configured to when identification information of a first communication device corresponding to the predetermined interface of the server in the design information and identification information of a second communication device indicated as connected to the predetermined interface of the server in the physical connection information are included in a plurality of pieces of predetermined identification information, determine that the predetermined setting corresponding to the design information is applicable to ports of the first communication device and the second communication device.

* * * * *